United States Patent Office 3,277,769
Patented Oct. 11, 1966

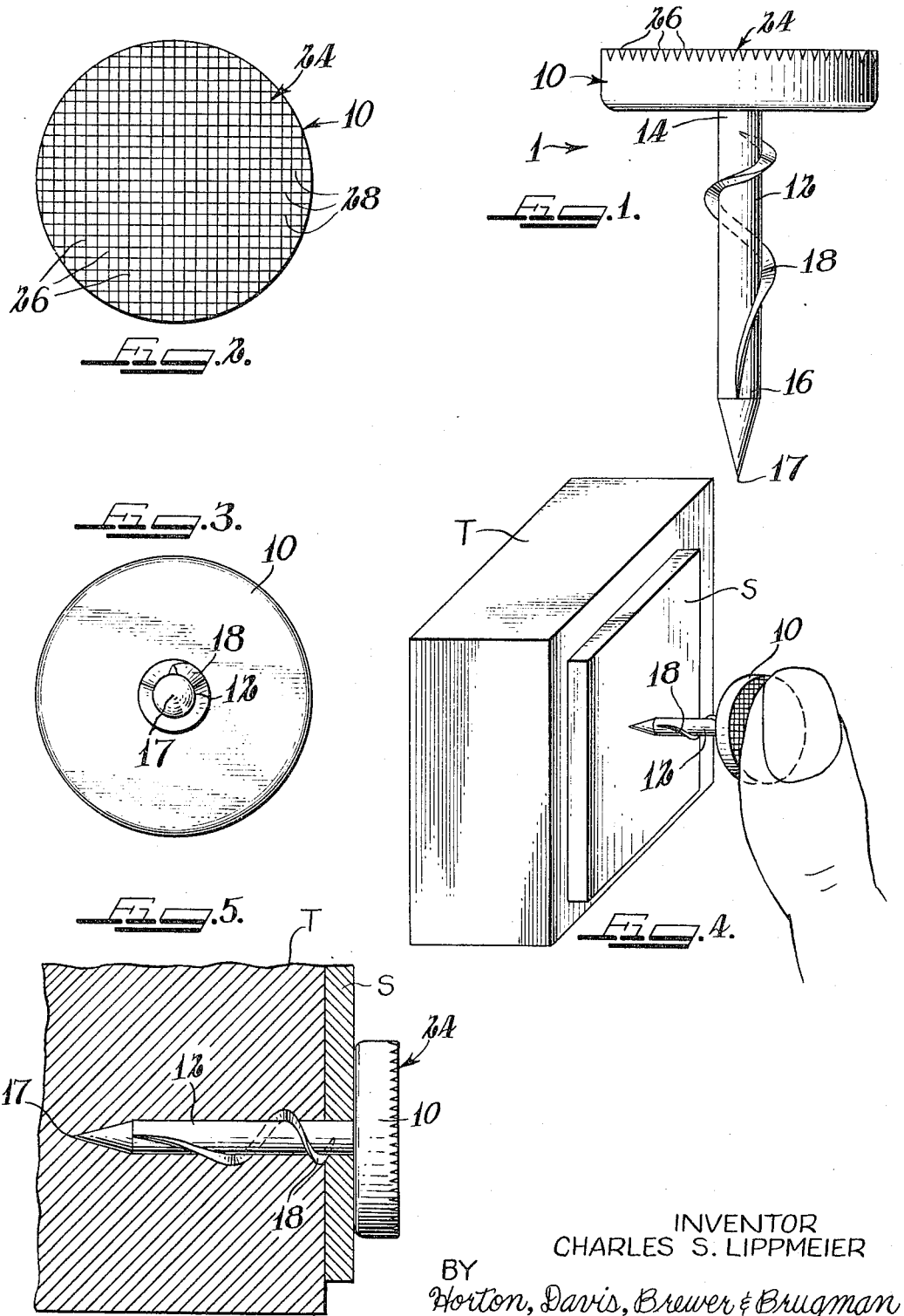

3,277,769
THUMB SCREW TACK
Charles S. Lippmeier, 117 N. Lotus, Chicago, Ill.
Filed Feb. 12, 1965, Ser. No. 432,217
1 Claim. (Cl. 85—44)

This invention relates to improvements in thumb tacks.

Thumb tacks are used in a variety of environments for well known purposes. They generally comprise a relatively flat or slightly domed head and a needle-like shank connected at one end to the head, the other end terminating in a sharp point to penetrate an object to be supported by the thumb tack against a tacking surface.

Many tacking surfaces used today are extremely soft and porous. Such surfaces frequently fail to grip the shank of thumb tacks sufficiently tightly to retain the tack shank within the tacking surface. As such objects to be supported by tacks tend to pull the tack shanks out of the tacking surface and the weight of the material causes it to fall.

This invention provides a novel thumb tack comprising a head and a shank in which said shank is secured at one end to said head and tapers at its other end to a sharp point, in which said shank is provided intermediate its ends with a thread decreasing continuously in pitch from the sharp point toward the head, and in which said head is provided with gripping means for manual rotation of said thumb tack as said thread penetrates the tacking surface for support and retention of an object to be positioned against the tacking surface.

It is therefore an object of this invention to provide a novel thumb tack which is securely retainable by soft and porous tacking surfaces.

It is a further object of this invention to provide a thumb screw having a threaded shank receivable by a tacking surface for securely retaining said screw thumb tack in supporting relationship to said tacking surface.

Another object contemplated by this invention is the provision of a thumb screw tack cooperable with tacking surfaces for secure retention thereby in which said thumb screw tack comprises an enlarged head and a threaded shank secured to one major surface of said enlarged head, said head being roughened on the other major surface thereof to provide a gripping surface for a user's finger to rotate said screw thumb tack into and out of threaded engagement with a tacking surface.

A further object of this invention is the provision of a novel thumb tack structure having a threaded shank and an enlarged head, the thread of which decreases progressively in pitch from the free end of the tack shank toward the head end of the tack shank.

Also an object of this invention is the provision of a novel positioning assembly comprising a tacking surface, an object to be positioned and a thumb screw tack for supporting and positioning said object to be positioned against said tacking surface, in which said thumb screw tack comprises a head, a shank and a thread on said shank for resisting withdrawal of said shank from said tacking surface.

These and other objects and advantages of this invention will become apparent from the following description and drawings of which:

FIGURE 1 is a side elevational view of a thumb screw tack of this invention;

FIG. 2 is a plan view of the thumb screw tack of FIG. 1;

FIG. 3 is a bottom view of the thumb screw tack of FIG. 1;

FIG. 4 is a perspective view of the thumb screw tack of FIG. 1 positioned for insertion into a tacking surface for supporting and positioning an object; and FIG. 5 is a side elevational view, partially in section, of the thumb screw tack of FIG. 1 in engagement with the tacking surface of FIG. 4.

First referring to FIGURE 1, a presently preferred embodiment of my novel thumb screw tack 1 is there shown. Thumb screw tack 1 includes an enlarged generally planar head 10 and an elongated shank 12 secured thereto as by brazing at its connected end 14.

Shank 12 is of a cylindrical configuration and at its other or free end 16 tapers to a sharp point 17. Shank 12 is approximately one-half inch long and planar head 10 is approximately three-eighth inch in diameter.

Intermediate ends 14 and 16 of shank 12, a thread 18 is provided. Thread 18 terminates adjacent ends 14 and 16 and comprises one and one-half turns. As seen in FIG. 1, the pitch of thread 18 decreases as it approaches its connected end 14.

Thread 18 and shank 12, as shown, are integral. They may be formed as by machining or by any other conventionally used method for forming threads on a shank.

As seen in FIGS. 1 to 3, head 10 is substantially planar and is circular in plan view. The upper surface of head 10 is roughened as by the provision of milling 24 having a first parallel component 26 and a second parallel component 28 intersecting the first. The depth of milling 24 is considerably less than the dimension of head 10 normal to the plane of the upper surface.

The milling 24 of head 10 provides for the frictional engagement of the upper surface of head 10 with an individual's thumb or finger, making it possible to rotate thumb screw tack 1 into and out of threaded engagement with a tacking surface. That is illustrated in FIG. 4. Once thumb screw tack 1 has been threaded into engagement with a tacking surface T through an intermediate object S, object S is supported and positioned against tacking surface T thereby. Even if tacking surface T is of the type that does not normally securely retain the shank of a conventional thumb tack, it will securely retain thumb screw tack 1.

In use, an object S to be supported by thumb screw tack 1 is placed against a tacking surface T and held in place manually. The sharp point 17 of thumb screw tack 1 is then pushed through object S and into tacking surface T until thread 12 contacts tacking surface T. Thereafter the user's thumb is placed against milling 24 of head 10 and thumb screw tack 1 is rotated into tacking surface T by a user's thumb or finger 18 securely retaining the shank 12 of tack 1 within tacking surface T. In that manner the positioning assembly comprising tack 1, tacking surface T and the object S to be positioned, is completed. Because the pitch of the thread decreases as the connected end 14 is approached, as tack 1 is rotated into tacking surface T, the thread tends to compress and grip the interior of the tacking surface which lies adjacent the thread turns. That tends to enhance the retentiveness of the tack by tacking surface T. To release the object S, it is only necessary to rotate the thumb screw tack in a reverse direction (counterclockwise as seen in FIG. 4) until it is withdrawn from tacking surface T.

While only one embodiment of my invention has been described in detail pursuant to the requirements of the Patent Laws, the foregoing will make it clear to those ordinarily skilled in the art that various modifications may be made without departing from the spirit and scope of my invention.

I claim:

A thumb screw tack comprising an enlarged head having major upper and lower substantially parallel surfaces and an elongated shank having a free sharpened end and a second end centrally secured to said lower major surface of said enlarged head, the axis of said elongated shank being normal to said major lower surface, a thread on said shank comprising at least one turn extending from a point near, but spaced from, said free sharpened end to a point near said second end, said thread being of a relatively great pitch with said pitch gradually diminishing throughout the length of said thread, whereby the end of said thread near said free end extends substantially parallel to the longitudinal axis of said shank, said shank adapted to be retained by said thread in the material of a tacking surface into which the threaded shank of said thumb screw tack is inserted, the major upper surface of said head being roughened for frictional engagement of said head by a user's finger to facilitate rotational insertion of said threaded shank into a tacking surface.

References Cited by the Examiner

UNITED STATES PATENTS

| | | | |
|---|---|---|---|
| 83,699 | 11/1868 | Dunn | 85—46 |
| 1,435,134 | 11/1922 | Boley | 85—28 |
| 1,619,944 | 3/1927 | Leonard | 85—20 |
| 1,749,903 | 3/1930 | Cannon | 85—41 |

FOREIGN PATENTS

| | | |
|---|---|---|
| 13,521 | 6/1908 | Great Britain. |

CARL W. TOMLIN, *Primary Examiner.*

R. S. BRITTS, *Assistant Examiner.*